(12) United States Patent
Hinaga et al.

(10) Patent No.: US 8,559,678 B2
(45) Date of Patent: Oct. 15, 2013

(54) METHOD AND APPARATUS FOR DETERMINING SURFACE ROUGHNESS OF METAL FOIL WITHIN PRINTED CIRCUITS

(75) Inventors: Scott T. Hinaga, Palo Alto, CA (US); Soumya De, Rolla, MO (US); Davie Senk, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 13/285,199

(22) Filed: Oct. 31, 2011

(65) Prior Publication Data

US 2013/0108118 A1    May 2, 2013

(51) Int. Cl.
*G06K 9/00* (2006.01)
*H01R 12/04* (2006.01)

(52) U.S. Cl.
USPC ............................. 382/108; 382/274; 174/263

(58) Field of Classification Search
USPC ......... 382/100, 103, 108, 143–154, 162, 168, 382/173, 181, 189, 193, 199, 209, 217–224, 382/232, 254, 274–276, 287, 305, 312, 382/321; 174/262, 255, 263; 428/319.3, 428/546

See application file for complete search history.

(56) References Cited

U.S. PATENT DOCUMENTS

| | | | |
|---|---|---|---|
| 6,969,557 B2* | 11/2005 | Matsuda et al. | 428/546 |
| 8,134,084 B2* | 3/2012 | Kawaguchi et al. | 174/262 |
| 8,198,544 B2* | 6/2012 | Nakai et al. | 174/255 |
| 8,313,831 B2* | 11/2012 | Tanaka et al. | 428/319.3 |
| 2010/0252308 A1* | 10/2010 | Nakai et al. | 174/255 |

* cited by examiner

*Primary Examiner* — Seyed Azarian
(74) *Attorney, Agent, or Firm* — P. Su

(57) ABSTRACT

In one embodiment, a method includes capturing an image of a piece of a printed circuit board (PCB) that includes at least one inner layer having a metal foil portion. The piece of the PCB includes a cross-section of the inner layer having the metal foil portion. The method also includes determining a surface roughness of the metal foil portion, wherein determining the surface roughness of the metal foil portion includes processing the image.

28 Claims, 9 Drawing Sheets

METHOD AND APPARATUS FOR DETERMINING SURFACE ROUGHNESS OF METAL FOIL WITHIN PRINTED CIRCUITS

TECHNICAL FIELD

The disclosure relates generally to the fabrication and testing of printed circuit boards. More particularly, the disclosure relates to a method and apparatus for determining surface roughness of a metal foil or a conductor associated with internal layers of a printed circuit board.

BACKGROUND

In the fabrication of printed circuit boards (PCBs), the surface of metal foil traces or conductors of internal layers of the PCBs is often fairly rough. In general, the rougher the surface of metal foil traces associated with internal layers of a PCB, the stronger the bond between layers of the PCB.

The surface roughness of metal foil traces of a PCB, however, has an effect on the performance of the PCB. Typically, as the surface roughness of metal foil traces of a PCB increases, the electrical performance of the PCB decreases. For example, signal loss within a PCB generally increases as the roughness of metal foil traces increases. When signal loss becomes excessive, the performance of a PCB may be compromised.

Signal loss associated with a PCB may not be determined until after the PCB is fabricated, e.g., finished. Signal loss is generally measured during a signal-integrity analysis performed on an assembled PCB. However, the contribution of surface roughness of metal foil traces of internal layers of the PCB may not be determined using conventional roughness measurements, as conventional methods for measuring surface roughness may only be applied to raw foil, i.e., foil that has not yet been fabricated into an internal layer of a finished PCB. Thus, when it is determined that signal loss associated with a PCB is unacceptable, the contribution of surface roughness of metal foil traces of internal layers of the PCB may not be assessed.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
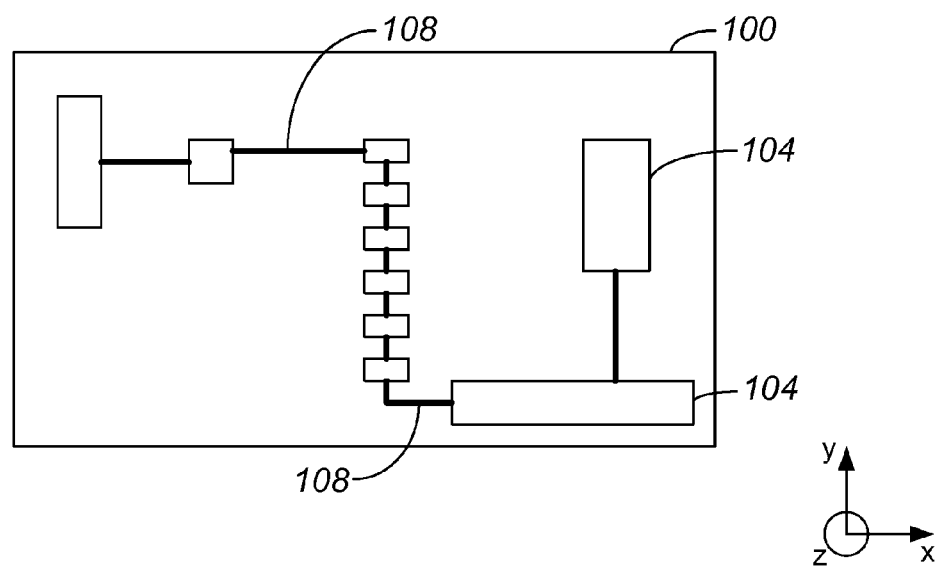
FIG. 1A is a diagrammatic representation of a top surface of a printed circuit board (PCB) in accordance with an embodiment.

According to one aspect, a method includes capturing an image of a piece of a printed circuit board (PCB) that includes at least one inner layer having a metal foil portion. The piece of the PCB includes a cross-section of the inner layer having the metal foil portion. The method also includes determining a surface roughness of the metal foil portion, wherein determining the surface roughness of the metal foil portion includes processing the image.

According to another aspect, an apparatus includes a processing arrangement, a first interface, and a roughness extraction module. The first interface is arranged to obtain an image that includes a depiction of a cross-section of a printed circuit board (PCB) having a plurality of layers. The cross-section of the PCB includes an inner layer of the plurality of layers that includes a metal foil portion having at least one edge. The roughness extraction module cooperates with the processing arrangement to process the image to determine a measured value of surface roughness associated with at least one edge.

Description

Specification and control of surface roughness of metal foil or conductors, e.g., copper foil or conductors, within printed circuit boards (PCBs) is critical to ensure that signal quality is acceptable for relatively high-speed PCB designs. Standard methods for measuring the surface roughness of metal foil may substantially only be applied to the metal foil prior to the incorporation of the metal foil into a finished PCB. Thus, as the signal quality of a PCB may not be determined until the PCB is fabricated, when a PCB is identified as having signal loss, identifying how much of the signal loss may be attributed to excessive signal roughness of metal foil within the PCB is generally not possible. Internal metal layers of a PCB are generally not accessible for measurement. In addition, the surface roughness of metal foil associated with inner layers of a PCB may not readily be determined once the PCB is finished.

By enabling the surface roughness of metal foil, e.g., metal foil associated with inner layers of a PCB, after the PCB is finished or formed, the contribution of surface roughness of metal foil to overall signal loss associated with the PCB may be determined. When the surface roughness of metal foil is determined to be out of specification, e.g., when the surface roughness of metal foil is excessive, processes used to fabricate PCBs may be adjusted to reduce the surface roughness to improve signal integrity of PCBs. Hence, the ability to determine the surface roughness of metal foil in a finished PCB allows corrections to be made in an overall PCB fabrication process such that subsequently produced PCBs may attain a desired signal integrity performance level.

In one embodiment, a cross-sectional sample of a finished PCB may be obtained and imaged, and a surface roughness calculation may be made with respect to metal foil in the sample using the image of the sample. By way of example, a piece of a finished PCB may be obtained and imaged, and the image may be enhanced such that the perimeter of a metal foil conductor in the piece of the PCB may be readily identified. Data associated with the perimeter of the metal foil conductor may then be obtained and processed such that surface roughness measurements may be determined. The surface roughness measurements may be compared against desired parameters to determine whether the surface roughness associated with metal foil in the finished PCB is within specification or outside of specification.

Surface roughness or texture may generally be defined, or otherwise characterized, by numerical values. Numerical values which characterize surface roughness may be determined using a profilometric data set associated with a particular surface. Statistical manipulation may be performed on a data set to substantially generate a numerical value for roughness. As will be appreciated by those skilled in the art, roughness parameters include $R_a$, $R_m$, $R_p$, $R_{pc}$, $R_q$, $R_{rms}$, $R_s$, $R_{sm}$, $R_t$, $R_y$, $R_z$, and $R_{3z}$. While any roughness parameters may generally be used to characterize the surface roughness of a metal foil associated with an inner layer of a PCB, surface roughness of a metal foil is typically characterized using $R_a$, $R_z$, and/or $R_{rms}$. $R_a$ may be determined using an algorithm which calculates an arithmetic average of absolute values, $R_z$ may be determined using an algorithm whose calculation incorporates a ten-point mean roughness, and $R_{rms}$ may be determined using an algorithm whose calculation incorporates a root mean squared value.

Figure 1B:
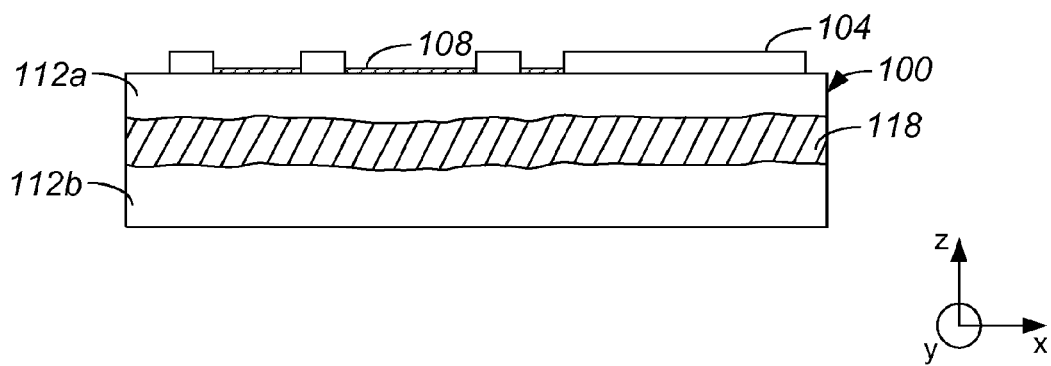
FIG. 1B is a diagrammatic representation of a side of a PCB, e.g., PCB 100 of FIG. 1A, in accordance with an embodiment.

Referring initially to FIG. 1A, a top surface of a PCB will be described in accordance with an embodiment. A PCB 100 may include any number of components 104, e.g., electrical and/or mechanical components, and metal foil traces or conductors 108. FIG. 1B is a side-view representation of PCB 100. It should be appreciated that although PCB 100 may include any number of layers 112a, 112b, 118. However, for ease of illustration, PCB 100 is shown as including two resin layers 112a, 112b with a single metal layer 118 therebetween, and is not drawn to scale.

Metal layer 118 is bonded on a top surface to layer 112a, and on a bottom surface to layer 112b. In one embodiment, metal layer 118 is a copper foil layer, although it should be appreciated that metal layer 118 may generally be formed from any suitable metal. As shown, metal layer 118 has surfaces, e.g., a top surface and a bottom surface relative to a z-axis, that include features. In other words, the surfaces of metal layer 118 have a surface roughness that may have an adverse effect on the performance of PCB 100.

When a finished PCB such as PCB 100 of FIGS. 1A and 1B is determined, e.g., during a test or qualification process, to have an unacceptable degree of signal loss, a cross-section of the PCB may be obtained such that an assessment may be made regarding whether the surface roughness of metal foil associated with inner layers of the PCB makes a significant contribution to the signal loss. In other words, a portion of a PCB that has an unacceptable level of signal loss may be processed to determine whether metal foil traces of inner layers of the PCB have a level of surface roughness that results in significant signal loss. In one embodiment, processing the portion of the PCB includes obtaining an image of the PCB.

Figure 2A:
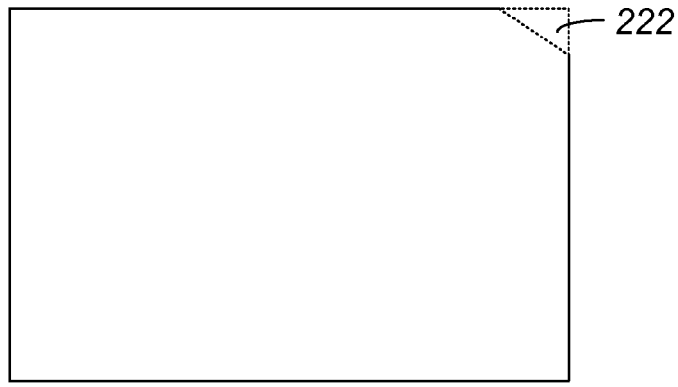
FIG. 2A is a diagrammatic representation of a PCB which depicts a portion of the PCB being removed for imaging purposes in accordance with a first embodiment.
Figure 2A:
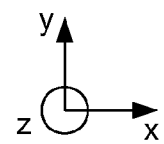
Figure 2B:
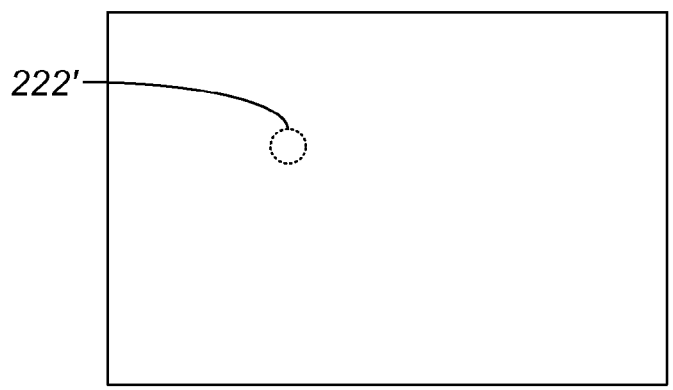
FIG. 2B is a diagrammatic representation of a PCB which depicts a portion of the PCB being removed for imaging purposes in accordance with a second embodiment.
Figure 2B:
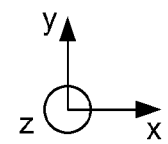

In order to obtain a cross-section of a finished PCB for imaging, the finished PCB may effectively be cut. A cross-section of a finished PCB may generally be obtained from any area of a PCB. For example, a corner of a PCB may be removed for imaging, or a section of the PCB away from the edges of the PCT may be removed for imaging. FIG. 2A is a diagrammatic representation of a PCB which depicts a portion of the PCB being removed for imaging purposes in accordance with a first embodiment. A corner 222 of a PCB 200 may be removed, e.g., cut away, to obtain a cross-section for imaging. FIG. 2B is a diagrammatic representation of a PCB which depicts a portion of the PCB being removed for imaging purposes in accordance with a second embodiment. A piece 222' of a PCB 200' may be obtained away from the edges of PCB 200'. Although piece 222' is shown as being substantially circular, the shape and/or size of piece 222' may vary widely.

Figure 3:
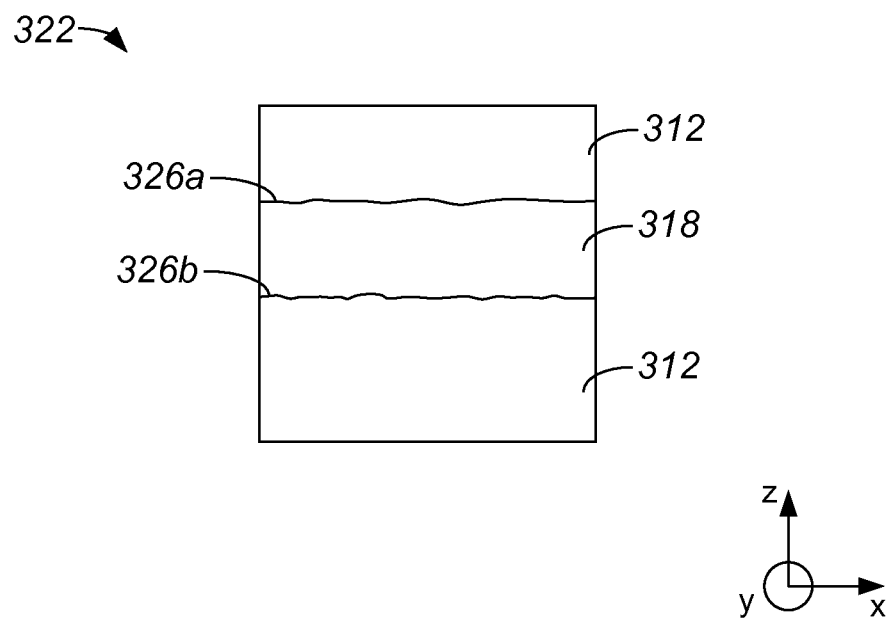
FIG. 3 is a diagrammatic cross-sectional representation of a portion of a PCB in accordance with an embodiment.

A portion of a PCB obtained for imaging purposes, e.g., piece 222 of FIG. 2A or piece 222' of FIG. 2B, is arranged such that at least one inner metal layer, or at least one inner metal foil is effectively captured in the portion. In general, a cross-section of an inner metal layer of a PCB is obtained. With reference to FIG. 3, a cross-sectional representation of a portion of a PCB will be described in accordance with an embodiment. A portion 322 of a PCB includes a plurality of layers 312, 318. As shown, resin layers 312 essentially sandwich a metal layer 318 therebetween. A top contour or border 326a and a bottom contour or border 326b are indicative of a surface roughness of metal layer 318. When an image of portion 322 is obtained, borders 326a, 326b may be processed by a surface roughness determination tool or application to obtain a numerical characterization of the surface roughness of metal layer 318.

Figure 4:
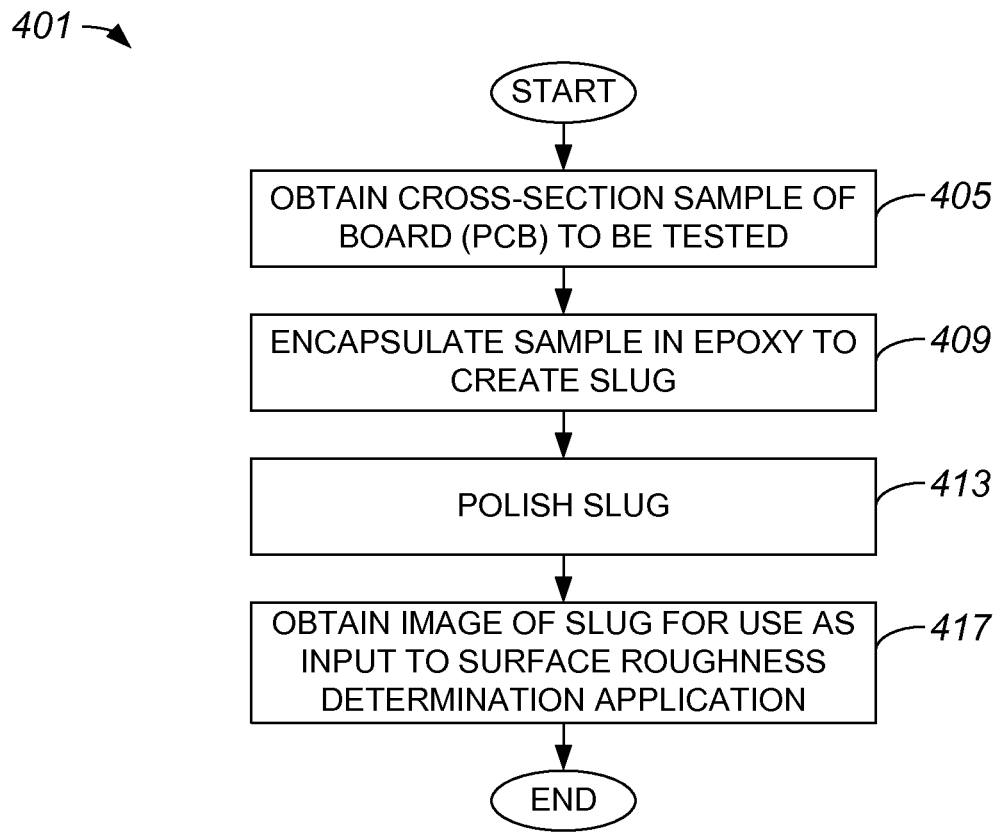
FIG. 4 is a process flow diagram which illustrates a method of preparing an input to a surface roughness determination tool in accordance with an embodiment.

Obtaining an image of portion 322 may include processing portion 322. In other words, portion 322 may be processed prior to an image being taken and provided as input to a surface roughness determination application. FIG. 4 is a process flow diagram which illustrates a method of preparing an input to a surface roughness determination application in accordance with an embodiment. A method 401 of preparing an input to a surface roughness determination application begins at step 405 in which a cross-section sample of a PCB that is to be tested is obtained. The sample may be obtained from substantially any part of the PCB, as previously mentioned.

Once the cross-section sample of the PCB is obtained, the sample may be encapsulated in epoxy or any other suitable potting compound suitable for encapsulating the cross-section sample in step 409 such that a slug, e.g., an encapsulated sample, is formed. In one embodiment, encapsulating the sample in epoxy facilitates the physical handling of the sample. In step 413, the slug is polished. After the slug is polished, an image of the slug is obtained for use as input to a surface roughness determination application, or a surface roughness extraction application, in step 417. The image of the slug may be a digital image, e.g., a JPEG photo of the slug, and may be of an optical resolution that is sufficient to enable details of the surfaces of a metal foil piece in the slug to be identified. In one embodiment, an image of the slug may be obtained through an optical microscope incorporating a digital camera that magnifies the slug. In another embodiment, the slug may be imaged through the use of a scanning optical microscope (SEM). Upon obtaining an image of the slug, the method of preparing an input to a surface roughness determination application is completed.

Figure 5:
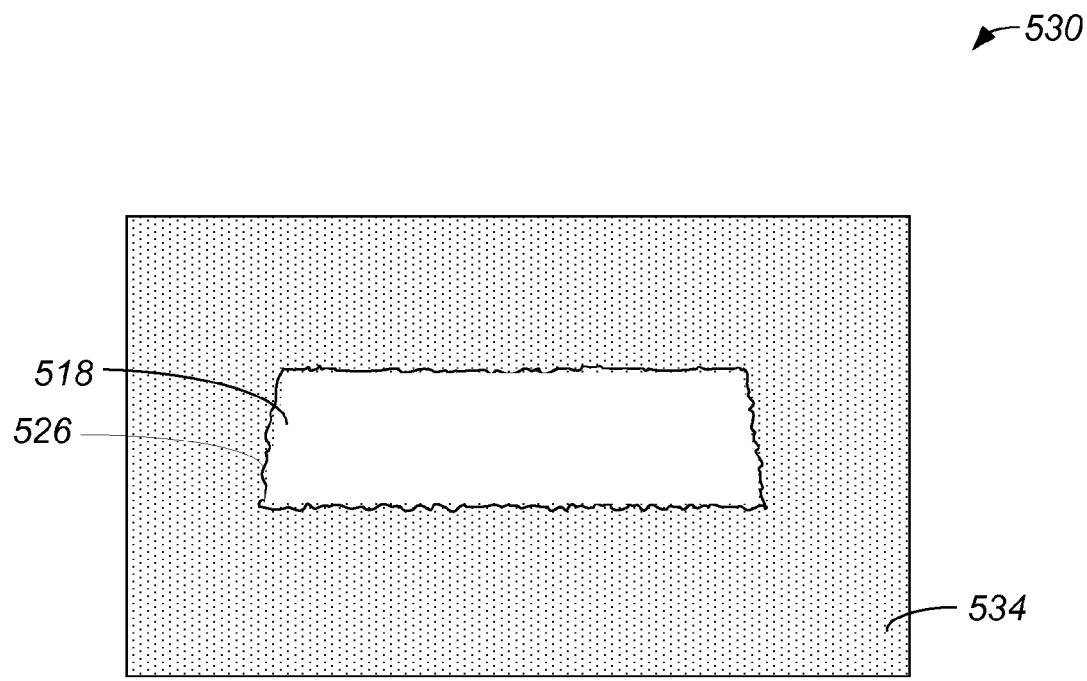
FIG. 5 is a diagrammatic representation of an image of a cross section of metal foil associated with an inner layer of a PCB in accordance with an embodiment.

An image taken of a slug may generally enable a metal foil piece, e.g., a copper foil piece, to be differentiated from other components of the slug, e.g., resin layers. FIG. 5 is a diagrammatic representation of an image of a cross section of metal foil associated with an inner layer of a PCB in accordance with an embodiment. An image 530 of a metal foil piece 518, e.g., a trace, of a PCB may be, but is not limited to being, a JPEG micro-photograph obtained from an SEM or an optical image. Image 530 is such that sufficient contrast exists between metal foil piece 518 and other areas 534 of image 530 to allow a contour or border 526 to be identified. In the described embodiment, border 526 is a perimeter of metal foil piece 518. As will be discussed below, the contrast between metal foil piece 518 and other areas 534 may be enhanced as needed.

Figure 6:
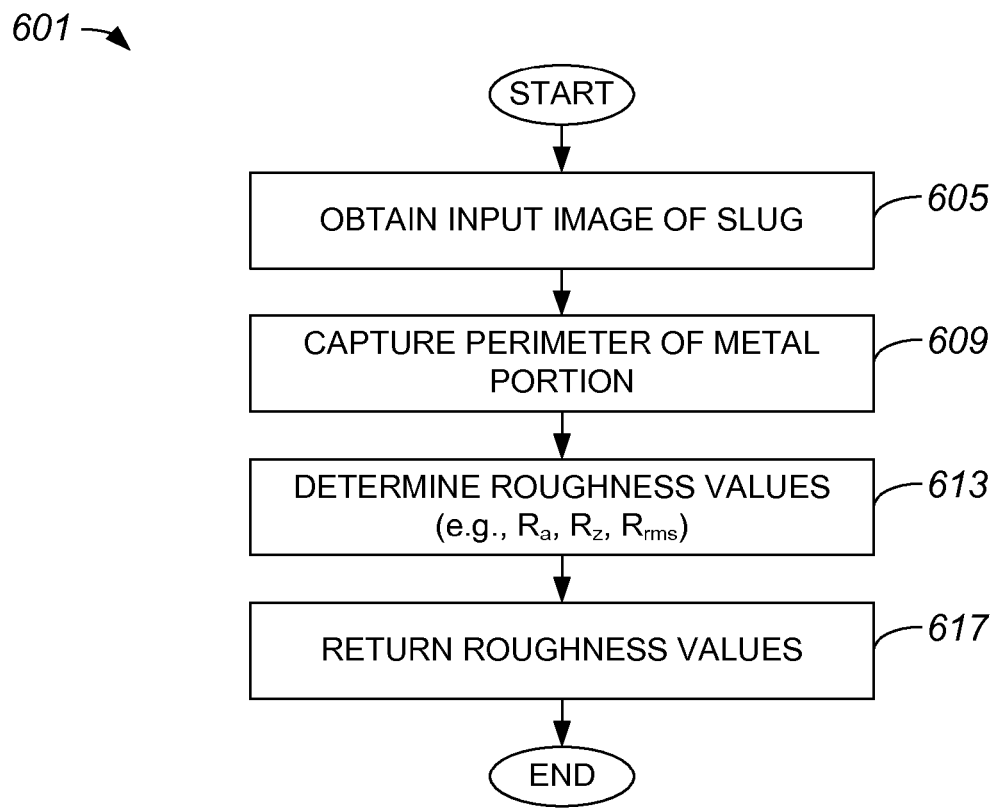
FIG. 6 is a process flow diagram which illustrates a general method of obtaining surface roughness measurements of metal foil associated with an inner layer of a PCB in accordance with an embodiment.

As image 530 includes metal foil piece 518 and border 526, image 530 may generally be provided as input to a surface roughness determination application such that the surface roughness of border 526 may be assessed. FIG. 6 is a process flow diagram which illustrates a general method of obtaining surface roughness measurements of metal foil associated with an inner layer of a PCB using a surface roughness determination application, or a roughness extraction tool, in accordance with an embodiment. A method 601 of executing a surface roughness determination application begins at step 605 in which an input image of a slug is obtained. In one embodiment, an input image of a slug may be obtained as a data file that is provided as an input port of a computing system with which the surface roughness determination application is associated. It should be appreciated that the input image of the slug includes a metal foil piece, or a metal portion. In one embodiment, the metal portion has a perimeter for which a measure of surface roughness is to be determined.

After the input image of the slug is obtained, the perimeter of the metal portion is captured in step 609. Capturing the perimeter or, more generally, at least one edge or border of the metal portion may include processing the image to characterize the perimeter. One method of capturing the perimeter of a metal portion will be described below with respect to FIG. 7.

Once the perimeter of the metal portion is captured, information relating to the perimeter may be used in step 613 to determine the roughness of the perimeter and, hence, the surface roughness of the metal portion. In the described embodiment, the roughness of approximately the entire perimeter may be determined. It should be understood, however, that in lieu of determining the roughness of approximately the entire perimeter, the roughness of any portion of the perimeter may be determined.

Although substantially any roughness value may be determined, in the described embodiment, the roughness values determined may be $R_a$, $R_z$, and/or $R_{rms}$. The roughness value that is determined may be based on, but is not limited to being based on, the profile of the metal portion, and/or the accuracy desired. When $R_a$ is to be determined, a mean line may be laid on a Cartesian coordinate system onto which the perimeter is mapped, and an arithmetical mean roughness is calculated. When $R_z$ is to be determined, distances between peaks and valleys of the perimeter may be measured, average peaks and average valleys may be identified, and average peaks and average valleys may be summed to identify a mean roughness. When $R_{rms}$ is to be determined, a root mean square may be calculated for a series of values associated with the perimeter.)

After roughness values are determined, the surface roughness determination application returns the roughness values in step 617. Returning the roughness values may include, but is not limited to including, displaying the roughness values on a display screen associated with the surface roughness determination application. Once the roughness values are returned, the method of executing a surface roughness determination application is completed.

Figure 7:
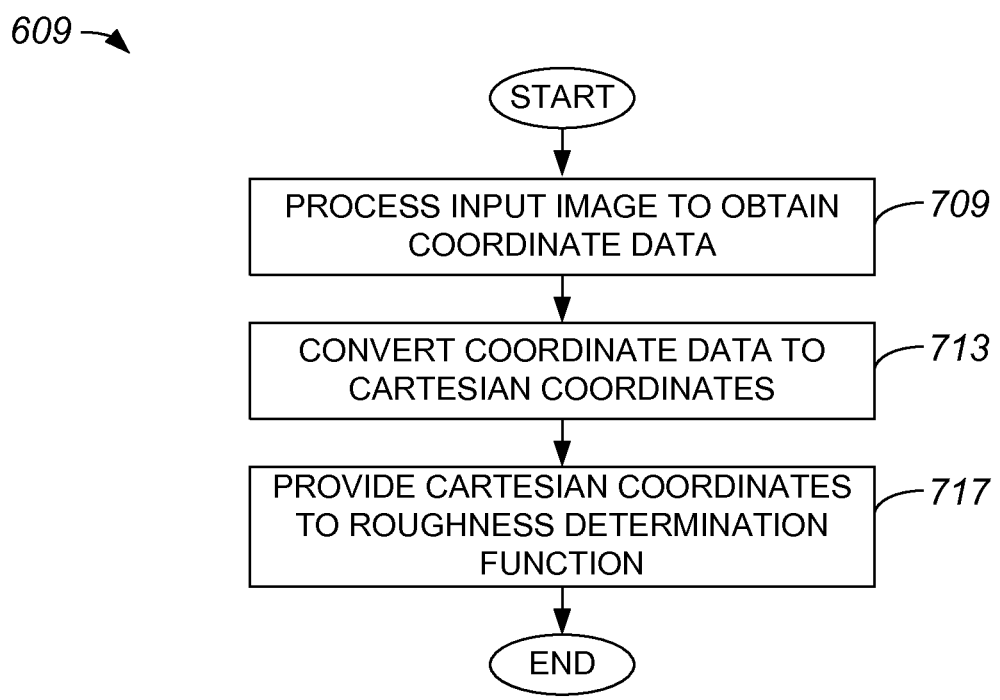
FIG. 7 is a process flow diagram which illustrates a method of capturing a perimeter of a portion of metal foil, e.g., step 609 of FIG. 6, in accordance with an embodiment.

With reference to FIG. 7, a method of capturing a perimeter of a metal portion depicted in an image, e.g., step 609 of FIG. 6, will be described in accordance with an embodiment. A method 609 of capturing a perimeter of a metal portion begins at step 709 in which the input image, i.e., the image that includes the metal portion, is processed to obtain coordinate data. Processing the image may include translating pixels associated with the image to coordinate data using any suitable method. For example, pixels associated with a perimeter of the metal portion or a surface of the metal portion may be translated to coordinate data. Translating pixels to coordinate data may include removing slope effects from images that are not level with respect to the boundaries of the digital image. In one embodiment, when a numerical computing application such as Matlab is used to process the image, a "detrend" function may be used to effectively remove slope effects. One example method of processing an input image to obtain coordinate data will be described below with respect to FIG. 8.

Figure 8:
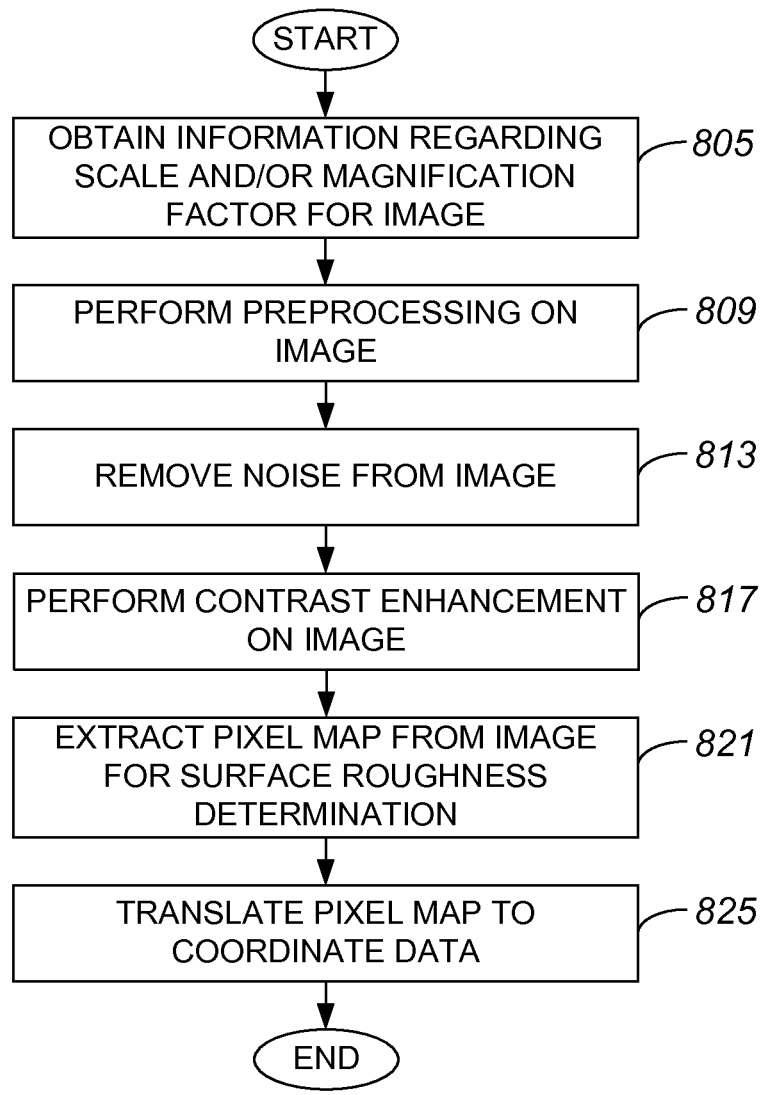
FIG. 8 is a process flow diagram which illustrates a method of processing an input image to obtain coordinate data, e.g., step 709 of FIG. 7, in accordance with an embodiment.

After the input image is process to obtain coordinate data, the coordinate data is converted in step 713 to Cartesian coordinates. In general, the coordinate data associated with the perimeter of a metal portion or a surface of the metal portion is converted or otherwise mapped to Cartesian coordinates, or X-Y coordinates. Once Cartesian coordinates are determined, the Cartesian coordinates are provided to a roughness determination function in step 717. The roughness determination function may generally process the X-Y coordinates associated with the perimeter of the metal portion of the input image to substantially extract roughness values such as $R_a$, $R_z$, and/or $R_{rms}$. Upon providing Cartesian coordinates to a roughness determination function the method of capturing a perimeter of a metal portion is completed FIG. 8 is a process flow diagram which illustrates a method of processing an input image that includes a representation of a metal portion to obtain coordinate data for a perimeter of the metal portion, e.g., step 709 of FIG. 7, in accordance with an embodiment. A method 709 of processing an input image to obtain coordinate data begins at step 805 in which information regarding a reference scale and/or magnification factor for the image is obtained. In one embodiment, information regarding the scale and/or magnification factor may be provided on the input image. A scale and/or magnification factor enhances the accuracy with which an image may be processed, as knowledge regarding the scale and/or magnification factor enables the relative sizes of features associated with a surface of a metal portion may be determined.

Preprocessing is performed on the image in step 809. Preprocessing generally entails improvement of an image definition of the boundary or contour between a metal layer and a surrounding dielectric. Preprocessing steps may include, but are not limited to including, digital deletion of pixels that correspond to artifacts in an image or sample which do not appear to correspond to actual surface features of a metal foil layer. Such artifacts may be induced, for example, as a result of non-optimal sample preparation or imaging techniques. After preprocessing is performed on the image, noise is removed from the image in step 813. Removing noise may include, but is not limited to including, applying a filter to effectively remove digital artifacts to more clearly define the perimeter, or boundary, around the metal portion depicted in the image. Artifacts may arise due to imperfections in digital imaging apparatus, or imaging software. Such artifacts may be associated with, for example, lossy digital imaging formats such as JPEG, and may include color banding, undesired half-toning, aliasing, and/or dithering. It should be appreciated that an artifact such as noise may arise due to non-optimal sample preparation that may arise, for example, when a sample is not cleaned and/or polished properly during a sample preparation process.

In step 817, contrast enhancement may be performed on the image in order to improve the accuracy with which the perimeter around the metal portion may be characterized. In one embodiment, contrast enhancement essentially forces the image to binary black and white such that the metal portion is substantially white and the surrounding areas of the image, e.g., resin areas, are substantially black.

Once contrast enhancement is performed on the image, a pixel map may be extracted from the image in step 821 such that surface roughness, represented by a boundary between black and white regions, may be determined. After the pixel map is extracted, the pixel map may be translated into coordinate data in step 825. As previously mentioned, translating pixels to coordinate data may include removing slope effects from an image that is not level. After pixels associated with a section, e.g., perimeter, of a metal portion depicted in the image are translated to coordinate data, the method of processing an input image to obtain coordinate data is completed.

Figure 9:
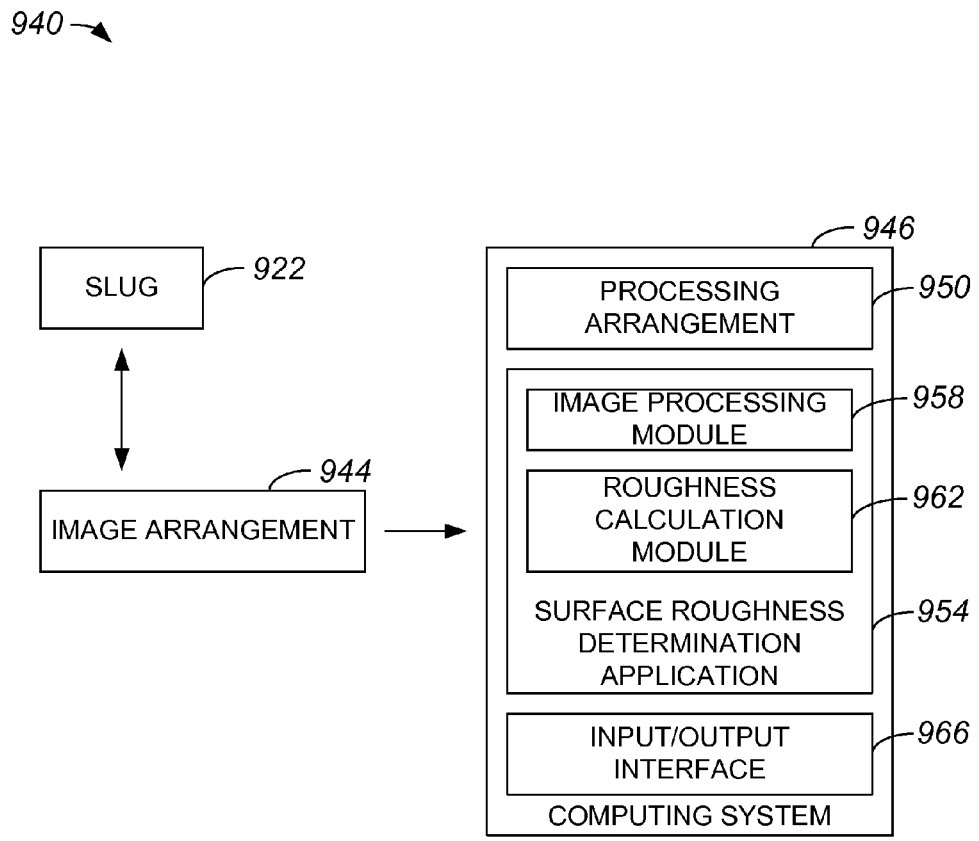
FIG. 9 is a diagrammatic representation of an overall system that is suitable for use in ascertaining a surface roughness of metal foil associated with an inner layer of a PCB in accordance with an embodiment.

In one embodiment, an overall system that may be used to ascertain a surface roughness of a metal portion or, more generally, metal foil associated with an inner layer of a PCB, may include an image capturing arrangement and a computing system. FIG. 9 is a diagrammatic representation of an overall system that is suitable for use in ascertaining a surface roughness of metal foil associated with an inner layer of a PCB in accordance with an embodiment. An overall system 940 includes an image arrangement 944 and a computing system 946. Although image arrangement 944 and computing system 946 are shown as being separate elements within overall system 940, it should be appreciated that image arrangement 944 may instead be a part of computing system 946.

Image arrangement 944 may be an SEM, a camera, or any other suitable device that is capable of capturing an image of a slug 922. As described above, slug 922 may generally include a cross-section of a PCB that includes a metal portion. Image arrangement 944 is configured to obtain an image of slug 922, and to provide the image to computing system 946, e.g., through an input/output interface 966 of computing system 946.

Computing system 946 includes a surface roughness determination or extraction application 954 that is arranged to process an image of slug 922 obtained from image arrangement 944. Surface roughness determination application 954 generally includes hardware and/or software logic configured to determine the surface roughness of a surface of a metal portion depicted in an image of slug 922. Surface roughness determination application 954 includes an image processing module 958 and a roughness calculation module 962. Image processing module 958 is arranged to process an image of slug 922 such that information contained in the image is effectively converted to X-Y coordinates that may be used by roughness calculation module 962 to extract at least one roughness parameter. In one embodiment, image processing module 958 is arranged to obtain a pixel map of an image of slug 922, to map the pixel map into Cartesian coordinate data. Image processing module 958 may also scale an image of slug 922, remove noise from the image of slug 922, and/or perform contrast enhancement on the image of slug 922. Roughness calculation module 962 may be arranged to apply algorithms to calculate numerical roughness values including, but not limited to including, $R_a$, $R_z$, and/or $R_{rms}$.

A processing arrangement 950 included in computing system 946 is arranged to execute software logic associated with surface roughness determination application 954. Input/output interface 966 may include input/output ports, and may be configured to communicate with image arrangement 944 to obtain an image of slug 922. In one embodiment, input/output interface 966 may include a display that displays results provided by surface roughness determination application 954.

Although only a few embodiments have been described in this disclosure, it should be understood that the disclosure may be embodied in many other specific forms without departing from the spirit or the scope of the present disclosure. By way of example, while determining the surface roughness of metal foil within a PCB has been described, the surface roughness of metal foil within other assemblies may be determined using the methods and apparatus described above. The surface roughness of metal foil within a metal clad laminate (MCL), which may include one or more metal layers bonded to a resin layer, may be determined using a surface roughness determination or extraction application as discussed above. In addition, a surface roughness of metal foil associated with a MCL that includes a resin-impregnated fabric may also be determined using a surface roughness determination or extraction application as discussed above. It should be appreciated that the roughness of a sample of bare metal foil, e.g., a metal sheet not incorporated into an MCL or a PCB, may also be determined in an analogous fashion.

The size and shape of a sample cross-section of a PCB obtained for use in determining the roughness of metal foil may vary widely. In addition, the location from which a sample cross-section is obtained may also vary widely. While it may be desirable to obtain a sample cross-section such that the integrity of a PCB is not compromised, e.g., such that the PCB may remain functional, when the integrity of the PCB is not an issue, the sample cross-section may be obtained from substantially any portion of the PCB.

Furthermore, the described techniques may be employed for other non-PCB applications within the field of high-frequency electronics in which measurement of surface roughness of a metal object is desired. By way of example, a waveguide structure, commonly used to transmit signals at microwave frequencies and above, may consist of a round or rectangular hollow metal cylinder of small diameter. As the interior surface of a waveguide may not be physically accessible such as to allow the use of conventional roughness measurement techniques, due at least in part to the small diameter, the methods described herein may be utilized for such a purpose by preparing a cross-sectional sample of the waveguide and applying the described measurement techniques thereto.

Generally, surface roughness may be determined for a metal surface of any size. In one embodiment, a user of a surface roughness determination or extraction application area may select an area of a metal portion for measurement. That is, a user may select a particular surface to measure. By way of example, a top of a metal foil portion, a bottom of a metal foil portion, or approximately an entire perimeter of a metal foil portion may be selected by a user for use in a surface roughness determination. An external surface of a foil cladding of an MCL may be associated with an innerlayer surface of a PCB and, as such, a surface roughness determination with respect to the top of the metal foil portion may enable a chemical or mechanical innerlayer adhesion promotion process to be adjusted if the surface roughness is determined to be unacceptable. An internal surface of the foil cladding of an MCL may be treated, e.g., texturized, by a foil producer to meet specified levels of surface roughness and, as such, a surface roughness determination with respect to the internal surface of the metal foil portion may provide the MCL producer with feedback with regards to whether the metal foil portion meets procurement specifications. A composite surface roughness value may be calculated for a full perimeter of a metal foil portion, and may be used to model overall roughness-induced signal loss on a finished PCB from which the metal foil portion was removed.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
capturing an image of a piece of a printed circuit board (PCB), the PCB including at least one inner layer having a metal foil portion, the image depicting a perimeter of the metal foil portion, wherein the piece of the PCB includes a cross-section of the at least one inner layer having the metal foil portion; and
determining a surface roughness of the metal foil portion, wherein determining the surface roughness of the metal foil portion includes processing the image to obtain coordinate data associated with at least a section of the perimeter.

2. The method of claim 1 further including:
obtaining the piece of the PCB; and
encapsulating the piece of the PCB in epoxy to form a slug before capturing the image of the piece of the PCB.

3. The method of claim 2 wherein capturing the image of the piece of the PCB includes capturing the image of the piece of the PCB using the slug.

4. The method of claim 1 wherein capturing the image of the piece of the PCB includes capturing the image using one selected from a group including a scanning electron microscope (SEM), an optical microscope, and a camera.

5. The method of claim 1 wherein determining the surface roughness of the metal foil portion further includes calculating at least one roughness value using the coordinate data.

6. The method of claim 5 wherein the at least one roughness value is one selected from a group including $R_a$, $R_z$, and $R_{rms}$.

7. The method of claim 5 wherein calculating the at least one roughness value using the coordinate data includes converting the coordinate data to Cartesian coordinates.

8. The method of claim 5 wherein processing the image to obtain the coordinate data includes extracting a pixel map associated with the perimeter and translating the pixel map into the coordinate data.

9. The method of claim 8 wherein processing the image to obtain the coordinate data further includes performing contrast enhancement on the image prior to extracting the pixel map.

10. An apparatus comprising:
means for capturing an image of a piece of a printed circuit board (PCB), the PCB including at least one inner layer having a metal foil portion, the image depicting a perimeter of the metal foil portion, wherein the piece of the PCB includes a cross-section of the at least one inner layer having the metal foil portion; and
means for determining a surface roughness of the metal foil portion, wherein the means for determining the surface roughness of the metal foil portion include means for processing the image to obtain coordinate data associated with at least a section of the perimeter.

11. A tangible, non-transitory computer-readable medium comprising computer program code, the computer program code, when executed, configured to:
capture an image of a piece of a printed circuit board (PCB), the PCB including at least one inner layer having a metal foil portion, the image depicting a perimeter of the metal foil portion, wherein the piece of the PCB includes a cross-section of the at least one inner layer having the metal foil portion; and
determine a surface roughness of the metal foil portion, wherein the computer program code configured to determine the surface roughness of the metal foil portion is further configured to process the image to obtain coordinate data associated with at least a section of the perimeter.

12. The tangible, non-transitory computer-readable medium of claim 11 wherein the computer program code configured to capture the image of the piece of the PCB is further configured to capture the image using one selected from a group including a scanning electron microscope (SEM), and optical microscope, and a camera.

13. The tangible, non-transitory computer-readable medium of claim 11 wherein the computer program code configured to determine the surface roughness of the metal foil portion is further configured to calculate at least one roughness value using the coordinate data.

14. The tangible, non-transitory computer-readable medium of claim 13 wherein the at least one roughness value is one selected from a group including $R_a$, $R_z$, and $R_{rms}$.

15. The tangible, non-transitory computer-readable medium of claim 13 wherein the computer program code configured to calculate the at least one roughness value using the coordinate data is further configured to convert the coordinate data to Cartesian coordinates.

16. The tangible, non-transitory computer-readable medium of claim 13 wherein the computer program code configured to process the image to obtain the coordinate data is further configured to extract a pixel map associated with the perimeter and to translate the pixel map into the coordinate data.

17. The tangible, non-transitory computer-readable medium of claim 16 wherein the computer program code configured to process the image to obtain the coordinate data is further configured to perform contrast enhancement on the image prior to extracting the pixel map.

18. An apparatus comprising:
a processing arrangement;
a first interface, the first interface being arranged to obtain an image, the image including a depiction of a cross-section of a printed circuit board (PCB) having a plurality of layers, wherein the cross-section of the PCB includes an inner layer of the plurality of layers that includes a metal foil portion having at least one edge; and
a roughness extraction module, the roughness extraction module being arranged to cooperate with the processing arrangement to process the image to determine a surface roughness associated with the at least one edge.

19. The apparatus of claim 18 wherein the roughness extraction module includes an image processing module and a roughness calculation module, the image processing module being arranged to cooperate with the processing arrangement to process the image to obtain data associated with the at least one edge, the roughness calculation module being arranged cooperate with the processing arrangement to process the data associated with the at least one edge to determine the surface roughness associated with the at least one edge.

20. The apparatus of claim 19 wherein the roughness calculation module is arranged to cooperate with the processing arrangement to determine the surface roughness by calculating at least one roughness value using the data, the data being Cartesian coordinate data.

21. The apparatus of claim 20 wherein the at least one roughness value is one selected from a group including $R_a$, $R_z$, and $R_{rms}$.

22. The apparatus of claim 19 wherein the image processing module is arranged to cooperate with the processing arrangement to process the image to obtain the data by extracting a pixel map from the image and transforming the pixel map into the data.

23. The apparatus of claim 22 wherein the image processing module is further arranged to cooperate with the processing arrangement to process the image to obtain the data by performing contrast enhancement on the image to identify the at least one edge.

24. The apparatus of claim 23 wherein the image processing module is further arranged to cooperate with the processing arrangement to process the image to obtain the data by removing noise from the image.

25. The apparatus of claim 19 wherein the data is Cartesian coordinate data, and wherein the image processing module is arranged to cooperate with the processing arrangement to transform the pixel map into the Cartesian coordinate data by translating the pixel map into coordinate data and converting the coordinate data to Cartesian coordinate data.

26. The apparatus of claim 25 wherein the processing arrangement is configured to convert the Cartesian coordinate data into at least one numerical value of roughness.

27. The apparatus of claim 26 wherein the at least one numerical value of roughness is communicated in graphical form using an electronic display.

28. The apparatus of claim 18 further including:
an image capturing arrangement, the image capturing arrangement being configured to obtain the image and to provide the image to the first interface.

* * * * *

UNITED STATES PATENT AND TRADEMARK OFFICE
CERTIFICATE OF CORRECTION

PATENT NO. : 8,559,678 B2  
APPLICATION NO. : 13/285199  
DATED : October 15, 2013  
INVENTOR(S) : Hinaga et al.

Page 1 of 1

It is certified that error appears in the above-identified patent and that said Letters Patent is hereby corrected as shown below:

IN THE TITLE PAGE

Item [75] Inventors:

"Scott T. Hinaga, Palo Alto, CA (US); Soumya De, Rolla, MO (US); Davie Senk, San Ramon, CA (US)"

should read:

-- Scott T. Hinaga, Palo Alto, CA (US); Soumya De, Rolla, MO (US); David Senk, San Ramon, CA (US) --

Signed and Sealed this
Seventeenth Day of December, 2013

Margaret A. Focarino
*Commissioner for Patents of the United States Patent and Trademark Office*